United States Patent
Yuuki

(10) Patent No.: US 10,989,939 B2
(45) Date of Patent: Apr. 27, 2021

(54) LIQUID CRYSTAL DISPLAY DEVICE

(71) Applicant: Mitsubishi Electric Corporation, Tokyo (JP)

(72) Inventor: Akimasa Yuuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/732,997

(22) Filed: Jan. 2, 2020

(65) Prior Publication Data
US 2020/0233244 A1    Jul. 23, 2020

(30) Foreign Application Priority Data
Jan. 21, 2019   (JP) .............................. JP2019-007499

(51) Int. Cl.
| G02F 1/13 | (2006.01) |
| G02F 1/1343 | (2006.01) |
| G02F 1/13357 | (2006.01) |
| F21V 8/00 | (2006.01) |

(52) U.S. Cl.
CPC ......... *G02F 1/1323* (2013.01); *G02B 6/0038* (2013.01); *G02B 6/0048* (2013.01); *G02F 1/133615* (2013.01); *G02F 1/134363* (2013.01)

(58) Field of Classification Search
CPC .................................................... G02B 6/0048
See application file for complete search history.

(56) References Cited

U.S. PATENT DOCUMENTS

| 7,633,586 | B2 | 12/2009 | Winlow et al. |
| 2007/0058108 | A1* | 3/2007 | Uehara ................ G02B 6/0068 349/86 |
| 2008/0285306 | A1* | 11/2008 | Sugihara ............... B60K 35/00 362/617 |
| 2015/0035872 | A1* | 2/2015 | Shima ............... G02F 1/133615 345/690 |
| 2017/0343724 | A1* | 11/2017 | Ohkawa .................... F21S 2/00 |
| 2019/0219869 | A1* | 7/2019 | Niu ....................... G02B 6/0091 |

FOREIGN PATENT DOCUMENTS

| JP | 3922735 B2 | 5/2007 |
| JP | 4363225 B2 | 11/2009 |
| JP | 4766542 B2 | 9/2011 |

\* cited by examiner

*Primary Examiner* — Alexander P Gross
(74) *Attorney, Agent, or Firm* — Studebaker & Brackett PC

(57) ABSTRACT

A liquid crystal display device includes a narrow light distribution backlight, a transparent backlight disposed in front of the narrow light distribution backlight, and a transmissive liquid crystal panel in a horizontal electrical field mode. The transparent backlight is a sidelight type backlight including a transparent light guide plate disposed to face the narrow light distribution backlight and a light source disposed on a side surface of the light guide plate. Prism-like irregularities extending in a vertical direction are formed on a surface of the light guide plate on a side of the narrow light distribution backlight. An electrode having a comb-like shape extending in a horizontal direction is disposed in each pixel of the transmissive liquid crystal panel.

9 Claims, 9 Drawing Sheets

FIG. 3

| ENTRANCE SURFACE | INCLINATION ANGLE OF ENTRANCE SURFACE | LIGHT BEAM ANGLE IN LIGHT GUIDE PLATE | EMISSION ANGLE FROM EMISSION SURFACE |
|---|---|---|---|
| LIGHT GUIDE REFLECTION SURFACE 31b | -20 | -6.8 | -10.3 |
| | -15 | -5.1 | -7.6 |
| | -10 | -3.4 | -5.0 |
| | -5 | -1.7 | -2.5 |
| | 0 | 0.0 | 0.0 |
| | 5 | 1.7 | 2.5 |
| | 10 | 3.4 | 5.0 |
| | 15 | 5.1 | 7.6 |
| | 20 | 6.8 | 10.3 |
| REFLECTION SURFACE 31c | 25 | 8.6 | 13.0 |
| | 30 | 10.5 | 15.9 |
| | 35 | 12.5 | 19.0 |
| | 40 | 14.6 | 22.3 |
| | 45 | 16.9 | 25.8 |

FIG 4

| REFLECTION SURFACE IN LIGHT GUIDE PLATE | INCLINATION ANGLE OF REFLECTION SURFACE | EMISSION ANGLE FROM EMISSION SURFACE |
|---|---|---|
| REFLECTION SURFACE 31c | 25 | -74.6 |
| | 30 | -48.6 |
| | 35 | -30.9 |
| | 40 | -15.1 |
| | 45 | 0.0 |

LIQUID CRYSTAL DISPLAY DEVICE

BACKGROUND OF THE INVENTION

Field of the Invention

The present invention relates to a liquid crystal display device, and particularly relates to an in-vehicle liquid crystal display device.

Description of the Background Art

Recently, an in-vehicle display device becomes popular, and there is a demand for a high-definition in-vehicle display device with a large screen which can meet a viewing of movie, for example. Particularly, with respect to a display device for a passenger seat, in terms of preventing driver distractions, it is required that the display device normally has wide view angle characteristics and is capable of switching, as necessary, the view angle characteristics to be narrow in a horizontal direction (right-left direction) so that a display image is not seen from a driver seat. For example, Japanese Patent Nos. 3922735, 4766542, and 4363225 disclose techniques capable of switching a range of a view angle of a liquid crystal display device.

SUMMARY

A display device capable of switching view angle characteristics has a problem of achieving a luminance profile having sufficient luminance not only in a main display direction but also a sub display direction in a display mode of a wide view angle (referred to as "the wide view angle mode" hereinafter), and also achieving a luminance profile in which the luminance is sufficiently reduced in a direction other than the main display direction in a display mode of a narrow view angle (referred to as "the narrow view angle mode" hereinafter).

The present invention provides a liquid crystal display device capable of achieving sufficient luminance in a wide view angle mode and sufficiently reducing the luminance in a display direction other than a main display direction in a narrow view angle mode.

A liquid crystal display device includes a first backlight, a second backlight which is transparent and disposed in front of the first backlight, and a transmissive liquid crystal panel in a horizontal electrical field mode disposed in front of the second backlight. The second backlight is a sidelight type backlight including a transparent light guide plate disposed to face the first backlight and a light source disposed on a side surface of the light guide plate. Prism-like irregularities extending in a vertical direction are formed on a surface of the light guide plate on a side of the first backlight. An electrode having a comb-like shape extending in a horizontal direction or an electrode having a slit extending in a horizontal direction is disposed in each pixel of the transmissive liquid crystal panel.

According to the liquid crystal display device of the present invention, in the wide view angle mode, both the first backlight and the second backlight are turned on to display the image in the transmissive liquid crystal panel, thus achievable is the luminance profile having the sufficient luminance not only in the main display direction but also in the sub display direction. In the narrow view angle mode, the first backlight is turned on and the second backlight is turned off to display the image in the transmissive liquid crystal panel, thus achievable is the luminance profile in which the luminance in the direction other than the main display direction is sufficiently suppressed.

These and other objects, features, aspects and advantages of the present invention will become more apparent from the following detailed description of the present invention when taken in conjunction with the accompanying drawings.

DESCRIPTION OF THE DRAWINGS

FIG. 3 is a drawing illustrating a relationship between inclination angles of a light-guide reflection surface and a reflection surface of a light guide plate included in the transparent backlight and an emission angle of light entering from a rear surface of the light guide plate.

FIG. 4 is a drawing illustrating a relationship between an inclination angle of the reflection surface of the light guide plate included in the transparent backlight and an emission angle of light entering from an entrance side surface of the light guide plate.

DESCRIPTION OF THE PREFERRED EMBODIMENTS

Embodiment 1

Figure 1:
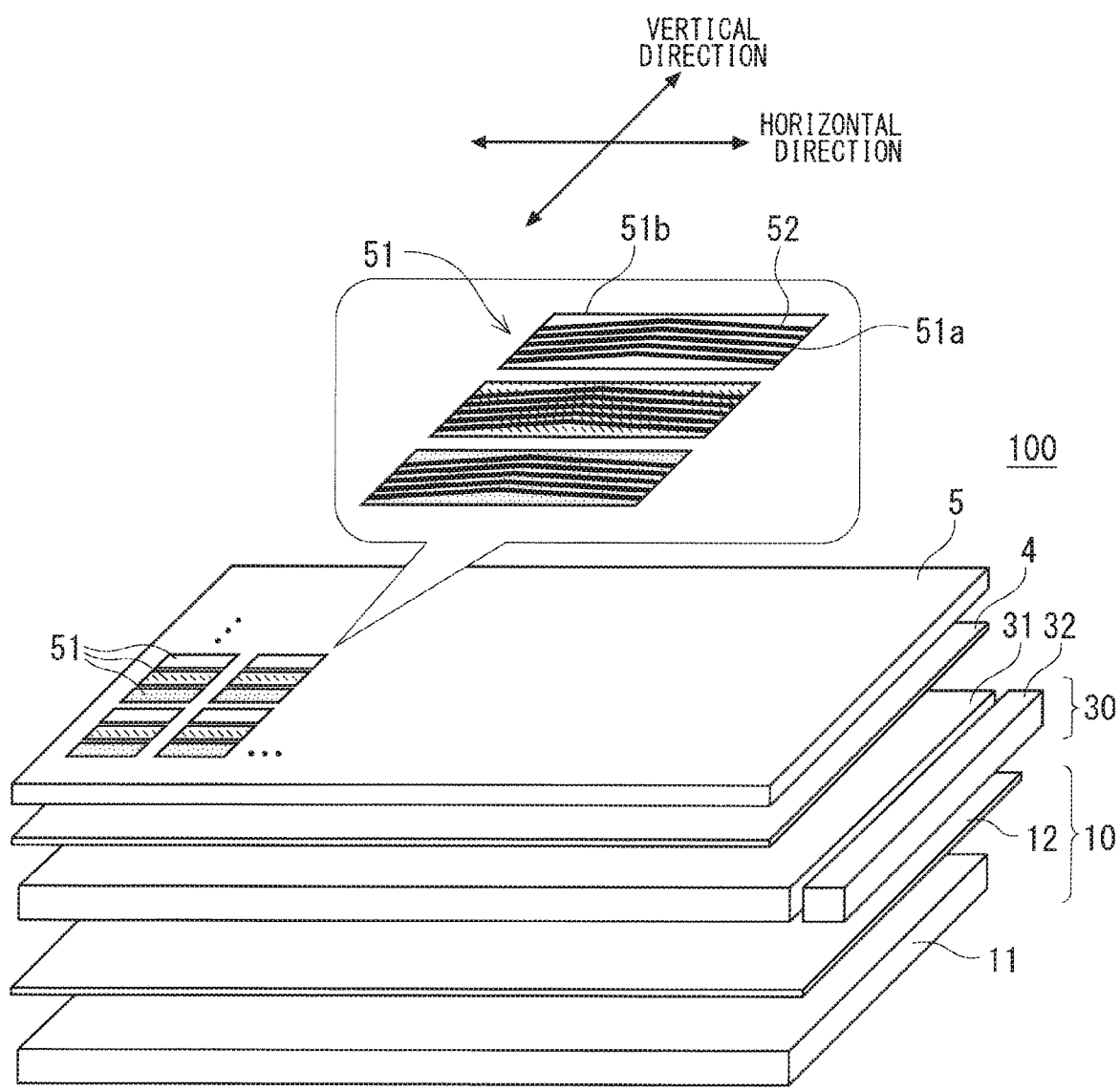
FIG. 1 is an exploded perspective view illustrating a configuration of a liquid crystal display device according to an embodiment 1.

FIG. 1 is an exploded perspective view illustrating a liquid crystal display apparatus 100 according to an embodiment 1. As illustrating in FIG. 1, the liquid crystal display device 100 includes a narrow light distribution backlight 10 which is a first backlight, a transparent backlight 30 which is a transparent second backlight disposed in front of the narrow light distribution backlight 10, an optical device 4 disposed in front of the transparent backlight 30, and a transmissive liquid crystal panel 5 disposed in front of the optical device 4.

The narrow light distribution backlight 10 is made up of a backlight 11 which is a planar light source and a view angle restricting film 12 provided on a front surface of the backlight 11. The view angle restricting film 12 has a function of restricting a light distribution of light emitted from the narrow light distribution backlight 10 in a horizontal direction (right-left direction) of the liquid crystal display device 100. More particularly, the view angle restricting film 12 internally includes a light shielding wall extending in a vertical direction (up-down direction) of the liquid crystal display device 100, and blocks light radiated from the backlight 11 in right and left oblique directions, thereby achieving a narrow light distribution in the horizontal direction. For example, a light control film (LCF ("LCF" is a registered trademark)) manufactured by 3M company and a louver array film (LAF) manufactured by Dai Nippon Printing Co., Ltd. can be used as the view angle restricting film 12.

Figure 2:
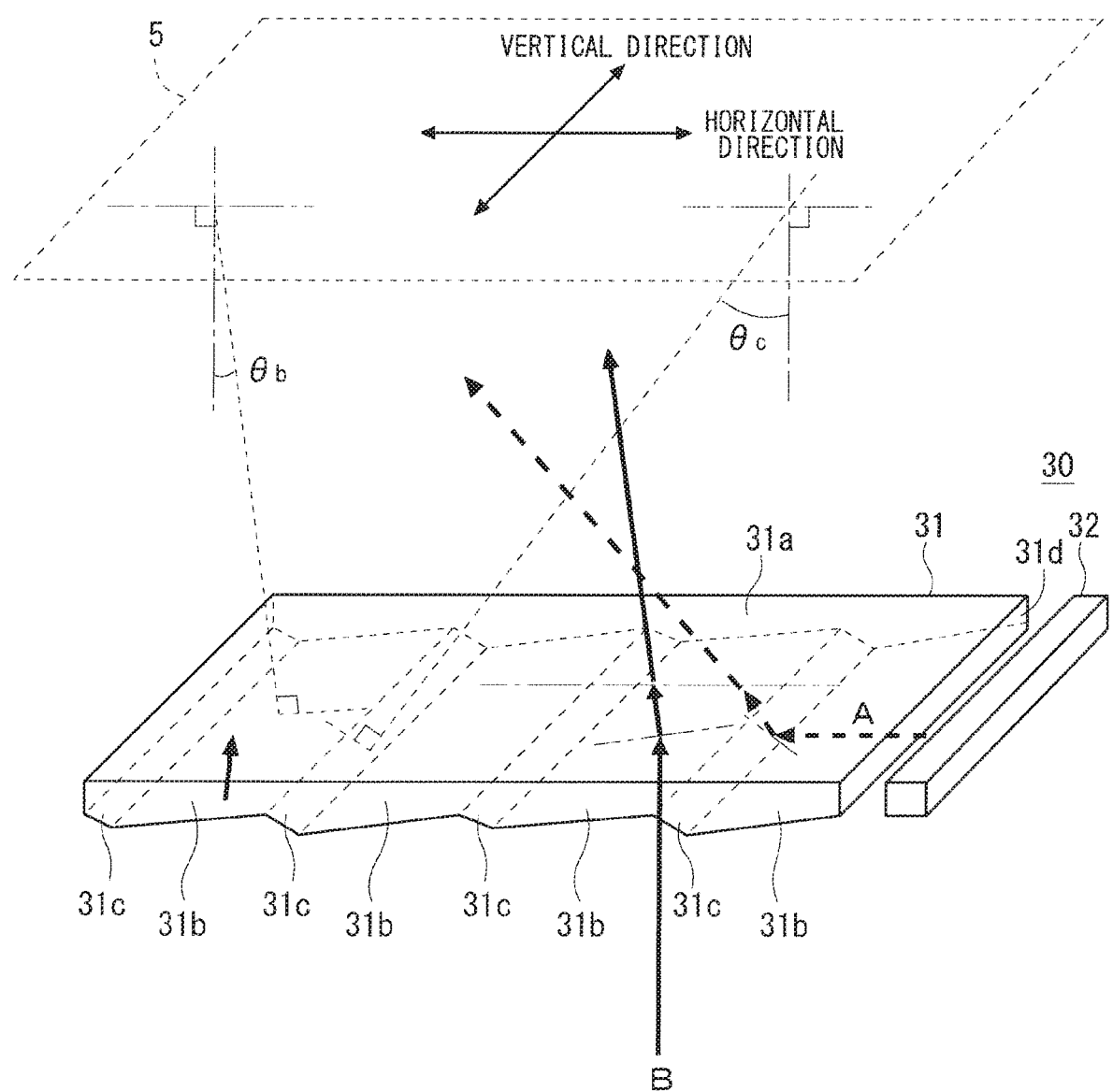
FIG. 2 is a perspective view illustrating a configuration of a transparent backlight of the liquid crystal display device according to the embodiment 1.

The transparent backlight 30 is a sidelight type backlight including a transparent light guide plate 31 disposed to face the narrow light distribution backlight 10 and a light source 32 disposed to face a side surface 31*d* of the light guide plate 31. As illustrated in FIG. 2, a front surface 31*a* of the light guide plate 31 in the transparent backlight 30 (on a side of the transmissive liquid crystal panel 5) is flat, and prism-like irregularities extending in the vertical direction are formed on a rear surface of the light guide plate 31 (a surface on a side of the narrow light distribution backlight 10). The prism-like irregularities has a structure that a surface 31*b* having a small inclination angle with respect to a display surface of the transmissive liquid crystal panel 5 (nearly parallel to the transmissive liquid crystal panel 5) and a surface 31*c* having a large inclination angle are alternately disposed. The surface 31*c* having the large inclination angle is inclined to face the light source 32 in an inner side of the light guide plate 31, and the surface 31*b* having the small inclination angle is inclined in a direction opposite to that of the surface 31*c*. In the present embodiment, a height of the prism-like irregularities is unified, thus the rear surface of the light guide plate 31 is substantially flat in the horizontal direction.

The front surface 31*a* of the transparent backlight 30 is referred to "the emission surface", the surface 31*b* having the small inclination angle in the rear surface of the transparent backlight 30 is referred to as "the light guide reflection surface", the surface 31*c* having the large inclination angle is referred to as "the reflection surface", and a side surface 31*d* on which the light source 32 is disposed is referred to as "the entrance side surface" hereinafter. In the inclination angles of the light guide reflection surface 31*b* and the reflection surface 31*c*, the inclination angle of the inner side of the light guide plate 31 inclined to face the light source 32 is defined as positive (+), and the inclination angle thereof inclined in a direction opposite to that defined as positive is defined as negative (−). Furthermore, in a traveling direction of the light emitted from the emission surface 31*a* (the emission direction), a front side direction of the emission surface 31*a* is defined as 0°, a direction inclined toward a side of the light source 32 is positive (+), and a direction inclined toward a direction opposite to that inclined toward the side of the light source 32 is defined to negative (−).

FIG. 3 illustrates a relationship between the inclination angles of the light guide reflection surface 31*b* and the reflection surface 31*c* of the light guide plate 31 and the emission angle of the light, which enters from the rear surface of the light guide plate 31, from the emission surface 31*a*. In a the present embodiment, the inclination angle of the light guide reflection surface 31*b* ($\theta_b$ in FIG. 2) is set to equal to or larger than −10° and equal to or smaller than +10° so that a change of the traveling direction of the light emitted from the narrow light distribution backlight 10 in the horizontal direction is limited to equal to or smaller than 10° (within ±5°). In the meanwhile, the inclination angle of the reflection surface 31*c* ($\theta_c$ in FIG. 2) is set to equal to or larger than +25° and equal to or smaller than +55°.

FIG. 4 illustrates a relationship between the inclination angle of the reflection surface 31*c* of the light guide plate 31 and the emission angle of the light, which enters from the entrance side surface 31*d*, from the emission surface 31*a*. With reference to FIG. 2, light A entering the entrance side surface 31*d* of the light guide plate 31 from the light source 32 is transmitted and dispersed in the light guide plate 31 while being reflected by the light guide reflection surface 31*b*, reflected by the reflection surface 31*c*, and then radiated from the emission surface 31*a* in an oblique direction. When a refraction index of the light guide plate 31 is approximately 1.5, the emission angle of the light radiated from the emission surface 31*a* can be adjusted to a direction of −74° to 0° by setting the inclination angle of the reflection surface 31*c* within a range of +25° to +45°. However, when the inclination angle of the reflection surface 31*c* is excessively large, a ratio of the light passing through the reflection surface 31*c* increases, thus the inclination angle of the reflection surface 31*c* is preferably set within a range of +25° to +40°.

Light B entering the light guide reflection surface 31*b* of the light guide plate 31 from the narrow light distribution backlight 10 is emitted from the emission surface 31*a* almost without a change of its traveling direction (the change of the traveling direction is within ±5°). The traveling direction of light (not shown) entering the reflection surface 31*c* from the narrow light distribution backlight 10 changes at approximately +25°, so that attention is required in that direction of the light.

Returning to FIG. 1, the optical device 4 is disposed between the transparent backlight 30 and the transmissive liquid crystal panel 5, and can electrically switch between a light scattering state and a light transmission state. Adaptable as the optical device 4 is, for example, a light control having a laminated structure that two transparent plastic sheets each having a transparent electrode (a transparent conductive film) are disposed to face each other with the transparent electrodes located inside, and polymer-dispersed liquid crystal (PDLC) is sandwiched therebetween. When voltage is applied to a liquid crystal layer sandwiched between the transparent electrodes to change a liquid-crystal molecular orientation, light scattering characteristics (the light scattering state and the light transmission state) of the light control film can be electrically changed. More specifically, for example, UMU FILM manufactured by NSG UMU PRODUCTS CO., LTD (standard type/high-shielding type) can be used ("UMU FILM" is a registered trademark). A transparent substrate with a transparent electrode may be used in place of the transparent plastic sheet with the transparent electrode, and a glass substrate and a translucent plastic substrate, for example, can be used as the transparent substrate.

The transmissive liquid crystal panel 5 is a liquid crystal panel in a horizontal electrical field mode. Any of a liquid crystal panel in a fringe field switching (FFS) mode and in-plane switching (IPS) mode ("IPS" is a registered trademark) can be used as the liquid crystal panel in the horizontal electrical field mode. Color pixels of the transmissive liquid crystal panel 5 is made up of three pixels of R(red), G(green), and B(blue) (referred to as "sub pixel" hereinafter).

As enlargedly illustrated in FIG. 1, an opening 51 of the sub pixel has a substantially rectangular shape in which a length of a vertical side 51*a* extending in a vertical direction is shorter than a length of a horizontal side 51*b* extending in a horizontal direction. Disposed in the opening 51 of the sub pixel is an electrode 52 having a comb-like shape in the IPS mode or a slit in the FFS mode. In the present embodiment, an extension direction of the electrode 52 having the comb-like shape or an extension direction of the slit of the electrode 52 is set in the horizontal direction.

As described above, the shape of the electrode 52 is different depending on whether the transmissive liquid crystal panel 5 is in the IPS mode or in the FFS mode, however, the electrode 52 is referred to as "the comb-like electrode 52", and the extension direction of the electrode 52 having the comb-like shape or the extension direction of the slit included in the electrode 52 is referred to as "the extension direction of the comb-like electrode 52" hereinafter for simplifying the explanation.

Figure 5:
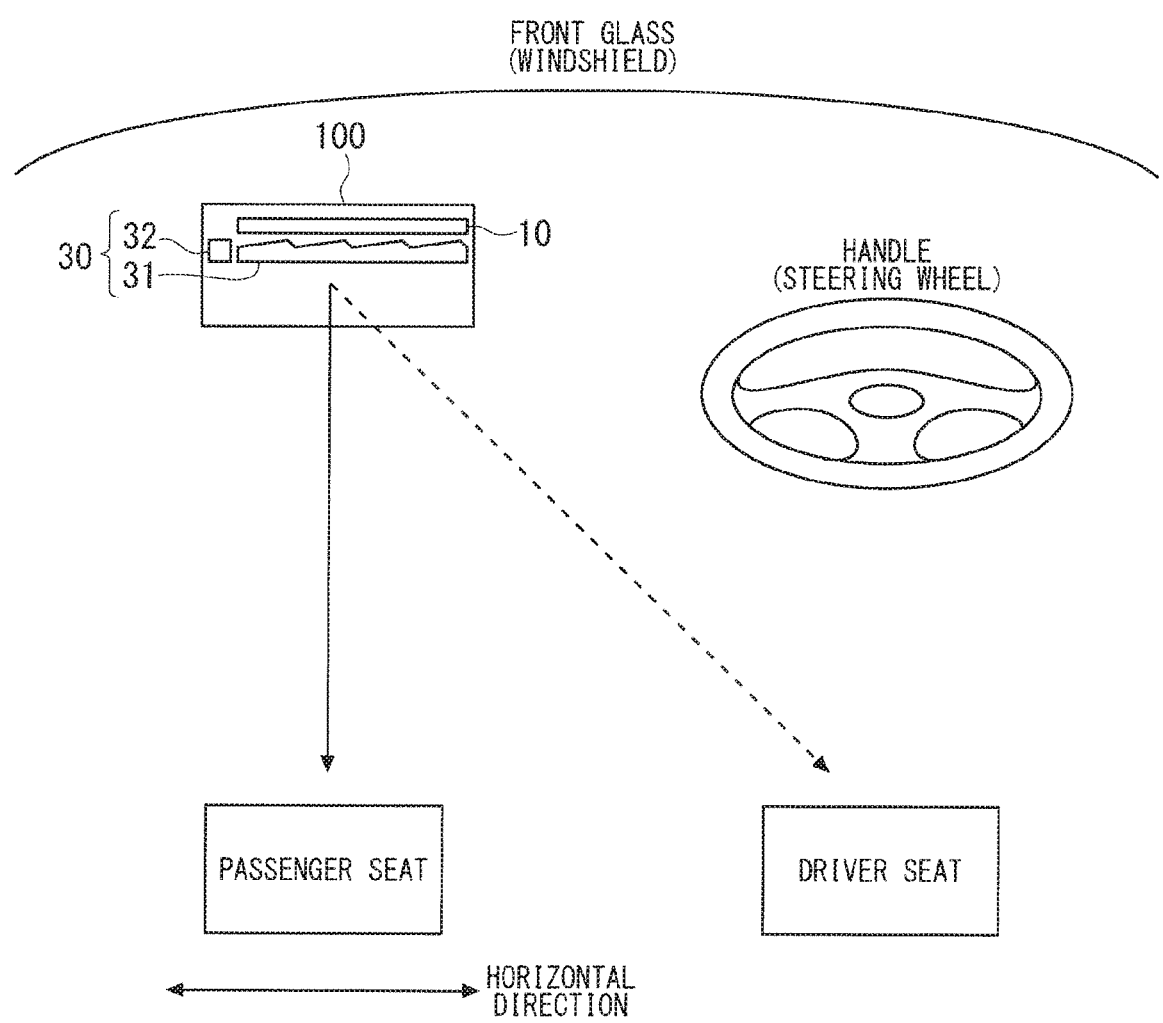
FIG. 5 is a schematic view of a vehicle interior in which the liquid crystal display device according to the embodiment 1 is disposed.

Next, an operation of the liquid crystal display device 100 is described. Herein described as an example is, as illustrated in FIG. 5, a case where the liquid crystal display device 100 is a display device for passenger seat disposed on a front side of the passenger seat in a vehicle. When viewed from the liquid crystal display device 100, the passenger seat is located in substantially a front side direction, and a driver seat is located in a left oblique direction (a direction of approximately −40°). In this case, the liquid crystal display device 100 has a configuration that the light source 32 of the transparent backlight 30 is located farther away from the driver seat on the light guide plate 31.

Described firstly is an operation of the liquid crystal display device 100 in a narrow view angle mode of displaying an image only in a passenger seat direction (a front side direction). In the narrow view angle mode, the liquid crystal display device 100 displays an image in the transmissive liquid crystal panel 5 in a state of turning on the narrow light distribution backlight 10, turning off the transparent backlight 30, and making the optical device 4 enter a light transmission state.

Light emitted from the backlight 11 of the narrow light distribution backlight 10 is converted into light having light distribution characteristics which is narrow in the horizontal direction (luminance in a direction of 40° is equal to or smaller than 1/10 of front side luminance) by the view angle restricting, film 12, and passes through the light guide plate 31 of the transparent backlight 30. At this time, the light guide reflection surface 31*b* of the light guide plate 31 has a small inclination angle, and the emission surface 31*a* is substantially flat in the horizontal direction, thus the light distribution characteristics of the light passing through the transparent backlight 30 is not widened by ±5° or more compared to the light distribution characteristics of the light of the narrow light distribution backlight 10. The light entering the reflection surface 31*c* of the light guide plate 31 from the narrow light distribution backlight 10 bends in a direction opposite to the driver seat, thus the luminance seen from the driver seat does not increase.

The optical device 4 is in the light transmission state, thus the light passing through the transparent backlight 30 enters the transmissive liquid crystal panel 5 with the light distribution characteristics of the light not widened in the horizontal direction by the optical device 4.

When the light passes through the transmissive liquid crystal panel 5, a diffraction scattering caused by a pixel array occurs. This diffraction is influenced by the shape of the opening 51 of the sub pixel, and is also influenced by the shape of the comb-like electrode 52 in the transmissive liquid crystal panel 5 in the horizontal electrical field mode. Specifically, a transmissivity distribution in a white display is formed along an extension direction of the comb-like electrode 52 in the opening 51 of the sub pixel, thus a large diffraction occurs in a direction orthogonal to the extension direction of the comb-like electrode 52.

In the liquid crystal display device 100 in the embodiment 1, the opening 51 of the sub pixel has a substantial rectangular shape in which the vertical side 51*a* is shorter than the horizontal side 51*b*, and the extension direction of the comb-like electrode 52 is parallel to the horizontal direction. The extension direction of the comb-like electrode 52 is parallel to the horizontal direction, thus the diffraction in the horizontal direction can be suppressed.

Figure 6:
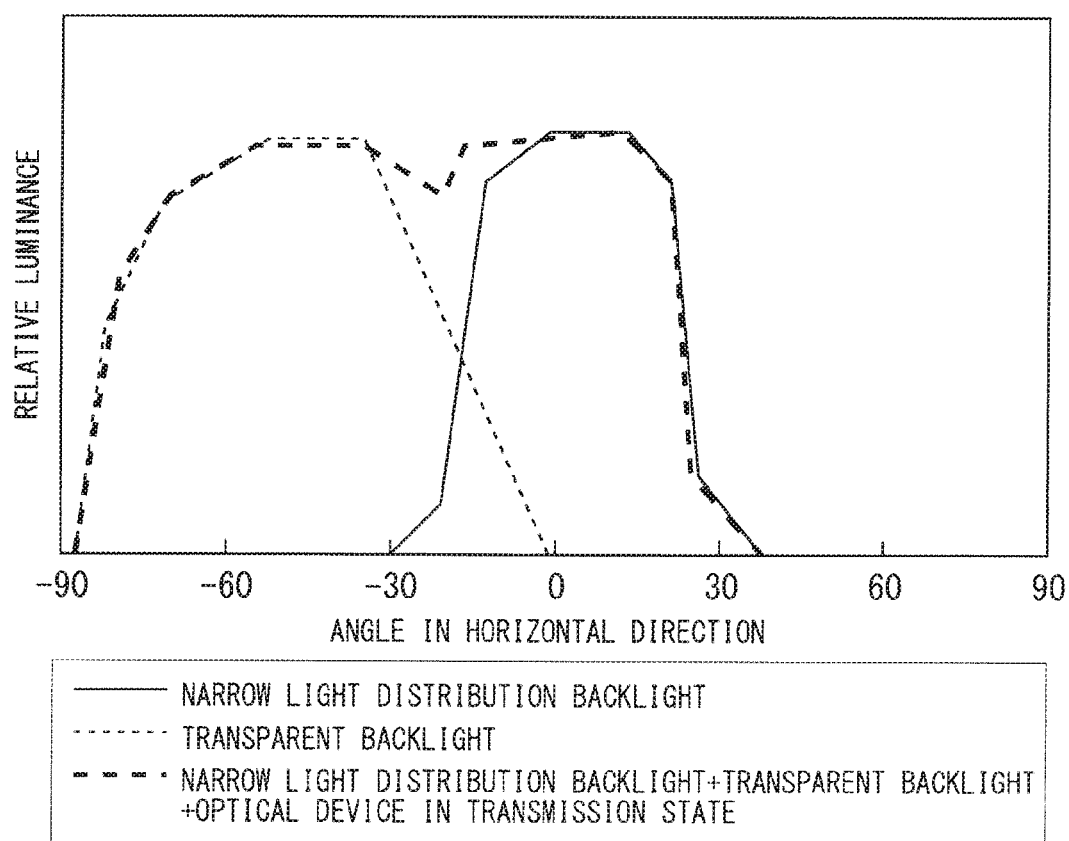
FIG. 6 is a graph expressing light distribution characteristics of a narrow light distribution backlight and the transparent backlight.

FIG. 6 is a graph expressing the light distribution characteristics of the narrow light distribution backlight 10 and the transparent backlight 30, and illustrates a relative luminance distribution at a time of displaying a white image on a whole screen of the transmissive liquid crystal panel 5. When only the narrow light distribution backlight 10 is turned on, the luminance in the direction of −40° is sufficiently suppressed as shown in the graph indicated by a thin solid line in FIG. 6. Accordingly, when the liquid crystal display device 100 operates in the narrow view angle mode, the image cannot be visually recognized from the driver seat. That is to say, achievable in the narrow view angle mode is a luminance profile in which the luminance in the direction other than the passenger seat direction which is the main display direction (the direction of 0°) is sufficiently suppressed.

Described next is an operation of the liquid crystal display device 100 in a wide view angle mode of displaying an image in both the passenger seat direction (the front side direction) and a driver seat direction (the direction of −40°). In the wide view angle mode, the liquid crystal display device 100 displays an image in the transmissive liquid crystal panel 5 in a state of turning on both the narrow light distribution backlight 10 and the transparent backlight 30 and making the optical device 4 enter a light scattering state.

A graph indicated by a thick broken line in FIG. 6 illustrates a relative luminance distribution in a case where a white image is displayed in a whole the transmissive liquid crystal panel 5 in a state of turning on both the narrow light distribution backlight 10 and the transparent backlight 30 and making the optical device 4 enter the light transmission state. The graph shows that the light from the narrow light distribution backlight 10 having a peak in the front side direction (the graph indicated by the thin solid line) and the light from the transparent backlight 30 having a peak in the direction of −40° (the graph indicated by the thin broken line) are overlapped with each other, and a wide light distribution is formed.

However, when the optical device 4 is in the light transmission state, a trough of the luminance occurs in the direction of −20°. The reason is that the diffraction scattering is suppressed in the horizontal direction of the transmissive liquid crystal panel 5 as described above. When there are irregularities (unevenness) in the luminance distribution as described above, an observer feels flickering in the luminance of the screen at a time of moving his/her head from side to side.

Figure 7:
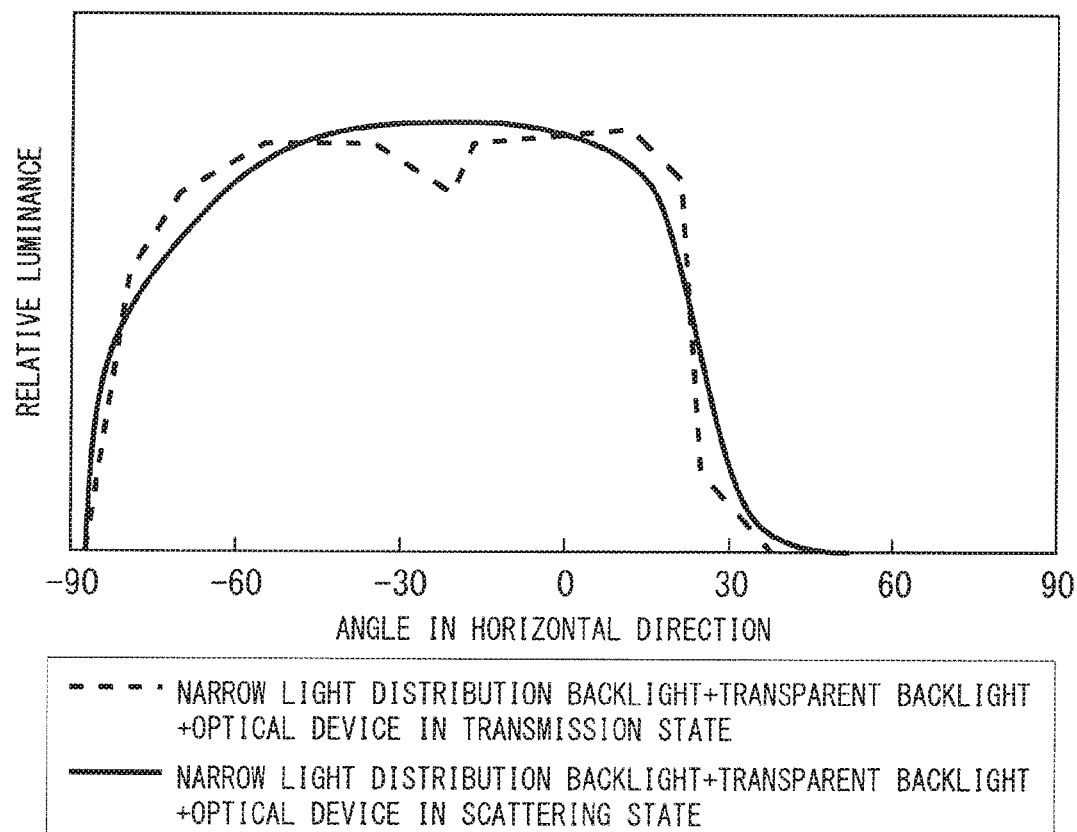
FIG. 7 is a graph expressing light distribution characteristics of the narrow light distribution backlight and the transparent backlight.

In order to avoid the occurrence of this problem, the optical device 4 enters the scattering state in the wide view angle mode in the present embodiment. When both the narrow light distribution backlight 10 and the transparent backlight 30 are turned on and the optical device 4 enters the light scattering state, the unevenness of the luminance distribution disappears as shown by the graph of the thick solid line in FIG. 7, and a smooth luminance profile is achieved. That is to say, the smooth luminance profile having the sufficient luminance can be achieved in both the passenger seat direction (the direction of 0°) which is the main display direction and the driver seat direction (the direction of −40°) which is the sub display direction. Accordingly, the observer does not feel flickering in the luminance of the screen at the time of moving his/her head from side to side.

Embodiment 2

Figure 8:
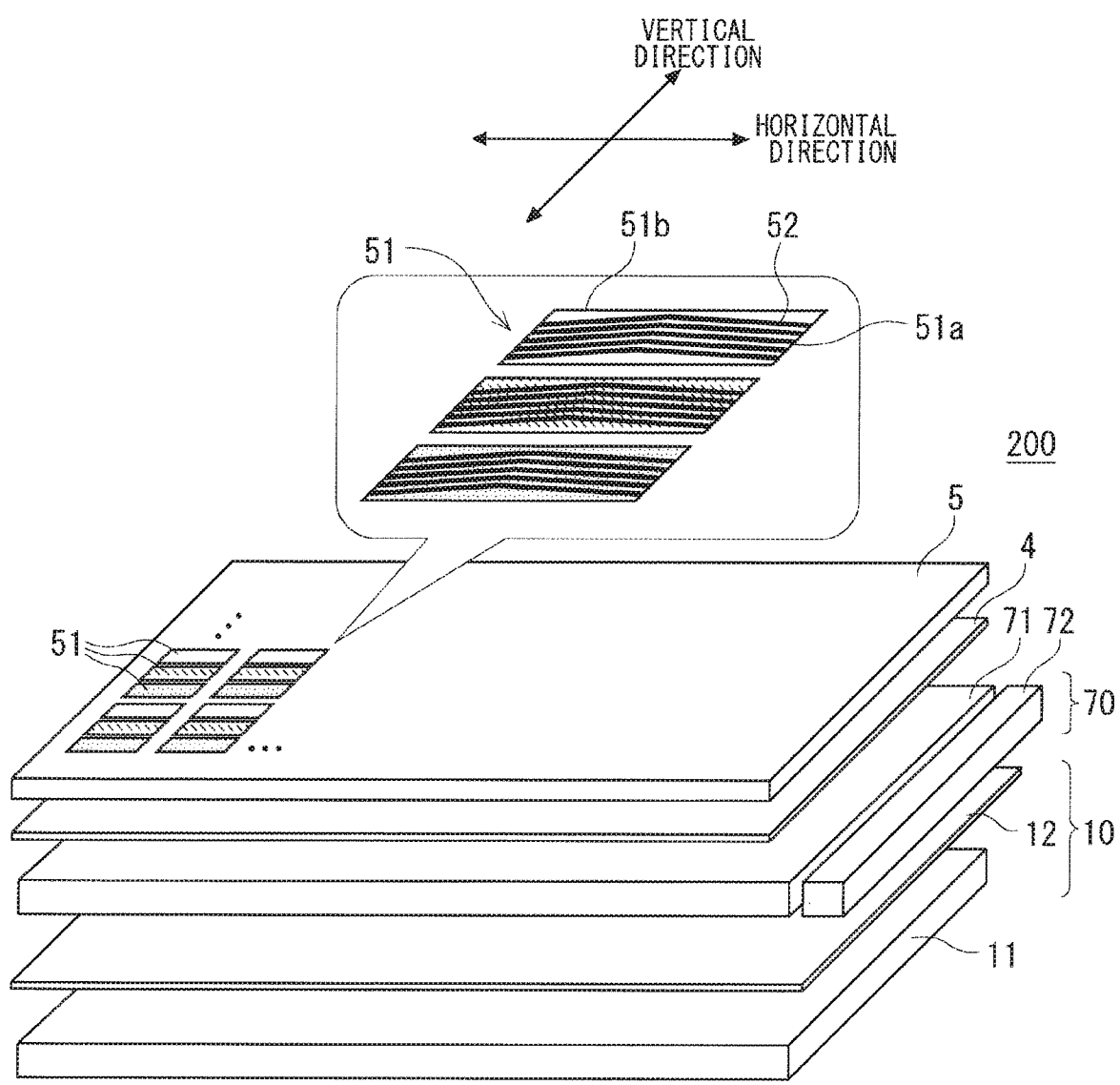
FIG. 8 is an exploded perspective view illustrating a configuration of a liquid crystal display device according to an embodiment 2.

FIG. 8 is an exploded perspective view illustrating a configuration of a liquid crystal display device 200 according to an embodiment 2. The liquid crystal display device 200 in the embodiment 2 is different from the liquid crystal display device 100 in the embodiment 1 (FIG. 1) in that the transparent backlight 30 is replaced with a transparent backlight 70. The other configuration elements are similar to those in the embodiment 1, thus, the detailed description thereof is omitted.

Figure 9:
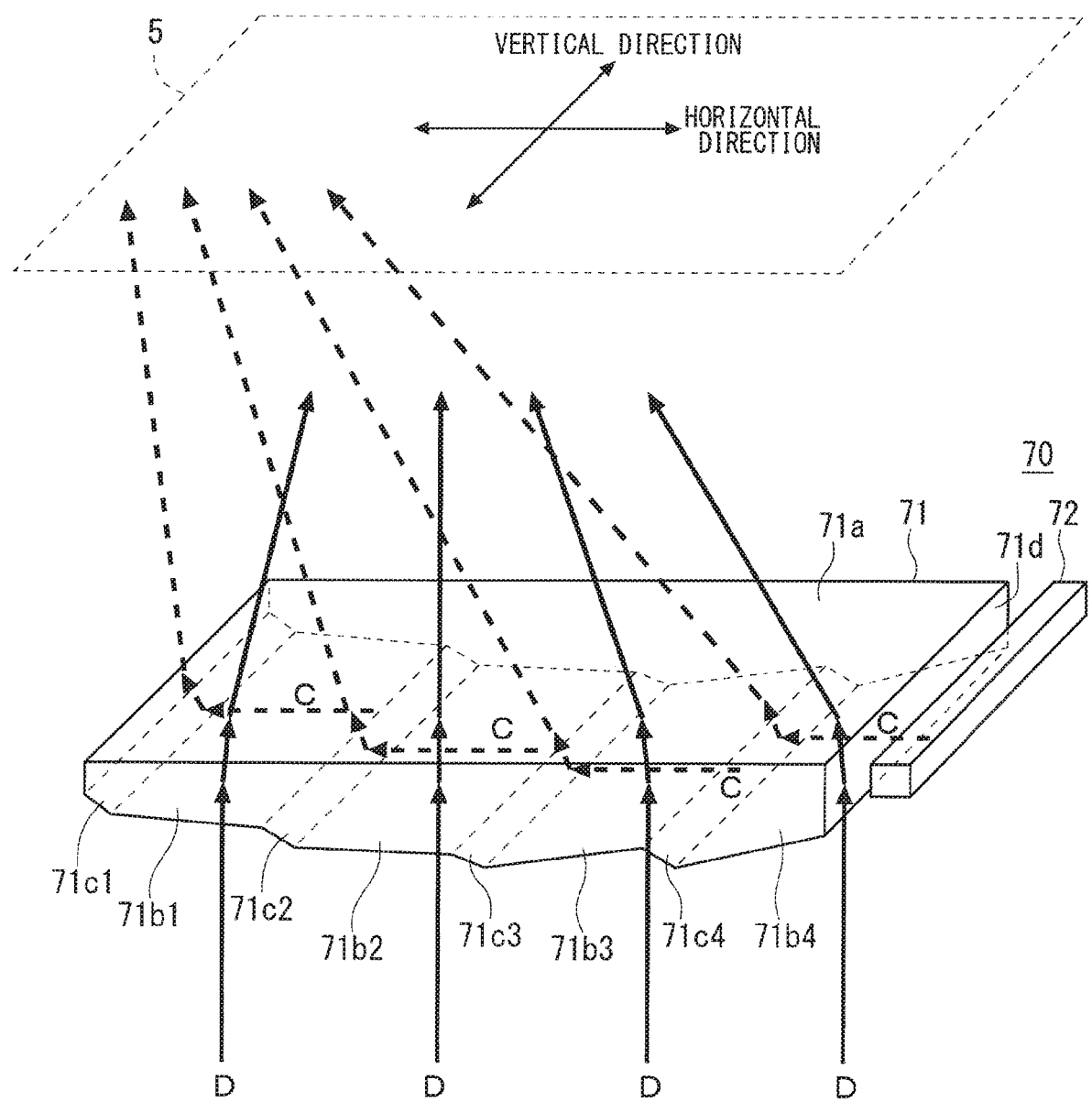
FIG. 9 is a perspective view illustrating a configuration of a transparent backlight of the liquid crystal display device according to the embodiment 2.

The transparent backlight 70 is a sidelight type backlight including a transparent light guide plate 71 disposed to face the narrow light distribution backlight 10 and a light source 72 disposed to face a side surface 71d of the light guide plate 71. As illustrated in FIG. 9, a front surface 71a of the light guide plate 71 in the transparent backlight 70 (on a side of the transmissive liquid crystal panel 5) is flat, and prism-like irregularities extending in the vertical direction are formed on a rear surface of the light guide plate (a surface on a side of the narrow light distribution backlight 10). The prism-like irregularities has a structure that surfaces 71b1 to 71b4 having a small inclination angle with respect to a display surface of the transmissive liquid crystal panel 5 (nearly parallel to the transmissive liquid crystal panel 5) and surfaces 71c1 to 71c4 having a large inclination angle are alternately disposed.

The front surface 71a of the transparent backlight 70 is referred to "the emission surface", each of the surfaces 71b1 to 71b4 having the small inclination angle in the rear surface of the transparent backlight 70 is referred to as "the light guide reflection surface", each of the surfaces 71c1 to 71c4 having the large inclination angle is referred to as "the reflection surface", and a side surface 71d on which the light source 72 is disposed is referred to as "the entrance side surface" hereinafter. In the inclination angles of the light guide reflection surfaces 71b1 to 71b4 and the reflection surfaces 71c1 to 71c4, the inclination angle of the inner side of the light guide plate 71 inclined to face the light source 72 is defined as positive (+), and the inclination angle thereof inclined in a direction opposite to that defined as positive is defined as negative (−). Furthermore, in a traveling direction of the light emitted from the emission surface 71a (the emission direction), a front side direction of the emission surface 71a is defined as 0°, a direction inclined toward a side of the light source 72 is positive (+), and a direction inclined toward a direction opposite to that inclined toward the side of the light source 72 is defined to negative (−).

In the present embodiment, the inclination angle of each of the light guide reflection surfaces 71b1 to 71b4 is set to equal to or larger than −10° and equal to or smaller than +10° so that a change of the traveling direction of the light emitted from the narrow light distribution backlight 10 in the horizontal direction is limited to equal to or smaller than 10° (within ±5°). In the meanwhile, the inclination angle of each of the reflection surfaces 71c1 to 71c4 is set to equal to or larger than +25° and equal to or smaller than +55°.

However, in the present embodiment, the inclination angles of the light guide reflection surfaces 71b1 to 71b4 and the inclination angles of the reflection surfaces 71c1 to 71c4 are not unified. Specifically, the inclination angle of each of the light guide reflection surfaces 71b1 to 71b4 increases with increasing distance from the light source 72 so that the inclination angle thereof located close to the light source 72 takes a negative value, and the inclination angle thereof located away from the light source 72 takes a positive value. The inclination angle of each of the reflection surfaces 71c1 to 71c4 gradually increases with increasing distance from the light source 72 in a range of positive value.

In FIG. 9, the inclination angle increases with increasing distance from the light source 72, for example, in order of distance from the light source 72, the inclination angle of the light guide reflection surface 71b4 is −10°, the inclination angle of the light guide reflection surface 71b3 is −5°, the inclination angle of the light guide reflection surface 71b2 is 0°, and the inclination angle of the light guide reflection surface 71b1 is 5°. In the similar manner, the inclination angle of each of the reflection surfaces 71c1 to 71c4 also increases with increasing distance from the light source 72 (the inclination angle of each of the reflection surfaces 71c1 to 71c4 takes a positive value).

In the light guide plate 71 having such a configuration, light D entering the light guide reflection surfaces 71b1 to 71b4 from the narrow light distribution backlight 10 bends in a direction away from the light source 72 on the light guide reflection surface 71b4 located close to the light source 72, and bends in a direction close to the light source 72 on the light guide reflection surface 71b1 located away from the light source 72, thus the light D emitted from the emission surface 71a is collected.

Light C entering the entrance side surface 71d of the light guide plate 71 from the light source 72 is reflected by the reflection surfaces 71c1 to 71c4, and radiated in an oblique direction from the emission surface 71a. At this time, the light C reflected by the reflection surface 71c1 located away from the light source 72 bends more than the light C reflected by the reflection surface 71c4 located close to the light source 72, thus the light C emitted from the emission surface 71a is also collected.

Figure 10:
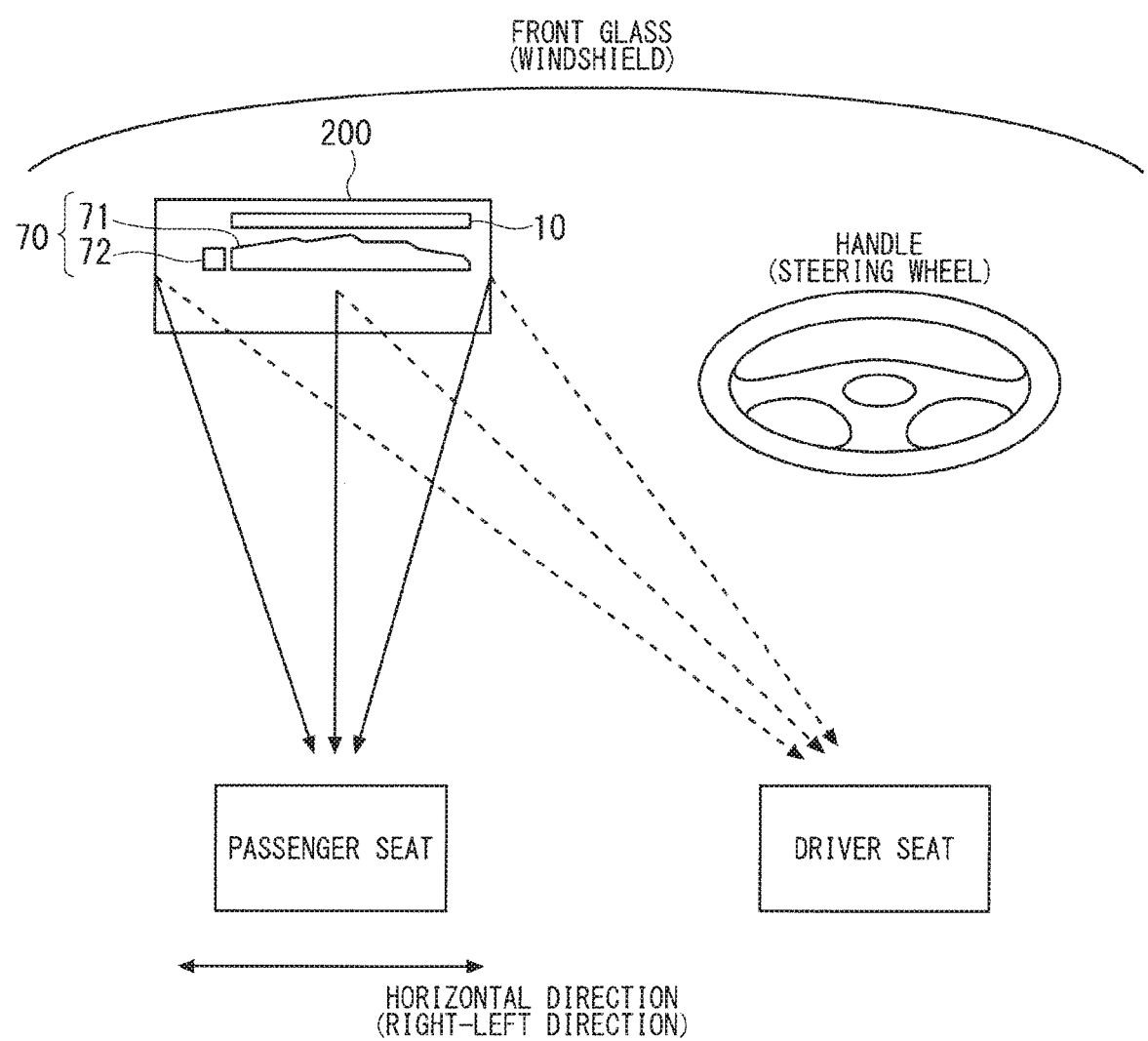
FIG. 10 is a schematic view of a vehicle interior in which the liquid crystal display device according to the embodiment 2 is disposed.

Next, an operation of the liquid crystal display device 200 is described. Herein described as an example is, as illustrated in FIG. 10, a case where the liquid crystal display device 200 is a display device for passenger seat disposed on a front side of the passenger seat in a vehicle. When viewed from the liquid crystal display device 200, the passenger seat is located in substantially a front side direction, and a driver seat is located in a left oblique direction (a direction of approximately −40°). In this case, the liquid crystal display device 200 has a configuration that the light source 72 of the transparent backlight 70 is located farther away from the driver seat on the light guide plate 71.

Described firstly is an operation of the liquid crystal display device 200 in a narrow view angle mode of displaying an image only in a passenger seat direction (a front side direction). In the narrow view angle mode, the liquid crystal display device 200 displays an image in the transmissive liquid crystal panel 5 in a state of turning on the narrow light distribution backlight 10, turning off the transparent backlight 70, and making the optical device 4 enter a light transmission state.

Light emitted from the backlight 11 of the narrow light distribution backlight 10 is converted into light having light distribution characteristics which is narrow in the horizontal direction (luminance in a direction of 40° is equal to or smaller than ¹/₁₀ of front side luminance) by the view angle restricting film 12, and passes through the light guide plate 71 of the transparent backlight 70. At this time, each of the light guide reflection surfaces 71$b$1 to 71$b$4 of the light guide plate 71 has a small inclination angle, and the emission surface 71$a$ is substantially flat in the horizontal direction, thus the light distribution characteristics of the light passing through the transparent backlight 70 does not increase by ±5° or more compared to the light distribution characteristics of the light of the narrow light distribution backlight 10. The inclination angle of each of the light guide reflection surfaces 71$b$1 to 71$b$4 increases with increasing distance from the light source 72, thus the light passing through the transparent backlight 70 is collected in the front side direction. Thus, the observer in the passenger seat can observe the light image over the whole screen of the liquid crystal display device 200. The light entering the reflection surfaces 71$c$1 to 71$c$4 of the light guide plate 71 from the narrow light distribution backlight 10 bends in a direction opposite to the driver seat, thus the luminance seen from the driver seat does not increase.

In the manner similar to the embodiment 1, the extension direction of the comb-like electrode 52 is parallel to the horizontal direction in the opening 51 of the sub pixel in the transmissive liquid crystal panel 5, thus the diffraction of the light in the horizontal direction in the transmissive liquid crystal panel 5 is suppressed. Accordingly, achievable in the narrow view angle mode is a luminance profile in which the luminance in the direction other than the passenger seat direction which is the main display direction (direction of 0°) is sufficiently suppressed.

Described next is an operation of the liquid crystal display device 200 in a wide view angle mode of displaying an image in both the passenger seat direction (the front side direction) and a driver seat direction (the direction of −40°). In the wide view angle mode, the liquid crystal display device 200 displays an image in the transmissive liquid crystal panel 5 in a state of turning on both the narrow light distribution backlight 10 and the transparent backlight 70 and making the optical device 4 enter a light scattering state.

In this case, the light from the narrow light distribution backlight 10 having a peak in the passenger seat direction and the light from the transparent backlight 70 having a peak in the driver seat direction are overlapped with each other, and a wide light distribution is formed. The inclination angle of each of the light guide reflection surfaces 71$b$1 to 71$b$4 increases with increasing distance from the light source 72, thus the light emitted from the narrow light distribution backlight 10 and passing through the transparent backlight 70 is collected in the passenger seat direction. Furthermore, the inclination angle of each of the reflection surfaces 71$c$1 to 71$c$4 increases with increasing distance from the light source 72, thus the light emitted from the light source 72 and reflected by the reflection surfaces 71$c$1 to 71$c$4 is collected in the driver seat direction. Thus, the observer in the passenger seat and the observer in the driver seat can observe the light image over the whole screen of the liquid crystal display device 200.

In the liquid crystal display device 200 in the embodiment 2, the observer in the driver seat and passenger seat can observe the light image over the whole screen of the liquid crystal display device 200. Thus, the optical device 4 may be omitted.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device, comprising:
   a first backlight;
   a second backlight which is transparent and disposed in front of the first backlight; and
   a transmissive liquid crystal panel in a horizontal electrical field mode disposed in front of the second backlight, wherein
   the second backlight is a sidelight type backlight including a transparent light guide plate disposed to face the first backlight and a light source disposed on a side surface of the light guide plate,
   prism-like irregularities extending in a vertical direction are formed on a surface of the light guide plate on a side of the first backlight, the prism-like irregularities having a structure that a reflection surface inclined to face the light source in an inner side of the light guide plate and a light guide reflection surface having a smaller inclination angle than an inclination angle of the reflection surface are alternately disposed,
   an electrode having a comb-like shape extending in a horizontal direction or an electrode having a slit extending in a horizontal direction is disposed in each pixel of the transmissive liquid crystal panel,
   in the inclination angle of the reflection surface and the inclination angle of the light guide reflection surface, when an inclination angle from a horizontal direction to the inner side of the light guide plate inclined to face the light source is defined as positive, and an inclination angle from the horizontal direction to the inner side of the light guide plane inclined to face away from the light source is defined as negative,
   the inclination angle of the light guide reflection surface gradually increases with increasing distance from the light source so that the inclination angle of the light guide reflection surface located close to the light source becomes negative and the inclination angle of the light guide reflection surface located away from the light source becomes positive, and
   the inclination angle of the reflection surface gradually increases with increasing distance from the light source in a range of a positive value.

2. The liquid crystal display device according to claim 1, wherein
   the first backlight is a narrow light distribution backlight including a view angle restricting film on a front surface of the first backlight.

3. The liquid crystal display device according to claim 1, wherein
   the first backlight emits light in a direction that is orthogonal to a front surface of the transmissive liquid crystal panel.

4. The liquid crystal display device according to claim 1, further comprising
   an optical device disposed between the second backlight and the transmissive liquid crystal panel and capable of switching between a light scattering state and a light transmission state.

5. The liquid crystal display device according to claim 4, wherein
   the first backlight is a narrow light distribution backlight including a view angle restricting film on a front surface of the first backlight.

6. The liquid crystal display device according to claim 1, wherein the inclination angle of the reflection surface is equal to or larger than +25° and equal to or smaller than +55°, and the inclination angle of the light guide reflection surface is equal to or larger than −10° and equal to or smaller than +10°.

7. The liquid crystal display device according to claim 6, wherein the first backlight is a narrow light distribution backlight including a view angle restricting film on a front surface of the first backlight.

8. The liquid crystal display device according to claim 6, further comprising an optical device disposed between the second backlight and the transmissive liquid crystal panel and capable of switching between a light scattering state and a light transmission state.

9. The liquid crystal display device according to claim 8, wherein the first backlight is a narrow light distribution backlight including a view angle restricting film on a front surface of the first backlight.

\* \* \* \* \*